(12) United States Patent
Svensson (10) Patent No.: US 9,308,904 B2
(45) Date of Patent: Apr. 12, 2016

(54) METHOD FOR OPERATING A HYDRAULIC BRAKE SYSTEM

(71) Applicant: FORD GLOBAL TECHNOLOGIES, LLC, Dearborn, MI (US)

(72) Inventor: Thomas Svensson, Leichlingen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 93 days.

(21) Appl. No.: 14/218,588

(22) Filed: Mar. 18, 2014

(65) Prior Publication Data
US 2014/0277981 A1    Sep. 18, 2014

(30) Foreign Application Priority Data

Mar. 18, 2013    (DE) .......................... 10 2013 204 716

(51) Int. Cl.
| | |
|---|---|
| *B60T 8/32* | (2006.01) |
| *B60T 7/04* | (2006.01) |
| *B60T 13/74* | (2006.01) |

(52) U.S. Cl.
CPC .............. *B60T 8/3265* (2013.01); *B60T 7/042* (2013.01); *B60T 13/745* (2013.01)

(58) Field of Classification Search
None
See application file for complete search history.

(56) References Cited

U.S. PATENT DOCUMENTS

| | | | |
|---|---|---|---|
| 3,891,071 A | | 6/1975 | Tuzson |
| 4,146,108 A | | 3/1979 | Sato |
| 5,372,409 A | * | 12/1994 | Farr ................................ 303/20 |
| 6,270,171 B1 | | 8/2001 | Krieg et al. |
| 6,554,744 B2 | | 4/2003 | Schmidt |
| 6,634,724 B2 | | 10/2003 | Kobayashi |
| 7,018,004 B2 | | 3/2006 | Chen et al. |
| 7,647,148 B2 | | 1/2010 | Lu |
| 7,853,389 B2 | | 12/2010 | Luehrsen et al. |
| 8,315,754 B2 | * | 11/2012 | Ajiro ............................... 701/22 |
| 8,444,229 B2 | | 5/2013 | Brewer et al. |
| 8,532,906 B2 | | 9/2013 | Lu et al. |
| 2002/0158510 A1 | | 10/2002 | Kobayashi |
| 2010/0152988 A1 | | 6/2010 | Olofsson |
| 2010/0191400 A1 | * | 7/2010 | Ajiro ............................... 701/22 |
| 2011/0144876 A1 | * | 6/2011 | Miah ............................... 701/70 |

FOREIGN PATENT DOCUMENTS

| | | |
|---|---|---|
| DE | 3241688 A1 | 5/1984 |
| WO | WO 2012/143310 A1 | 10/2012 |

OTHER PUBLICATIONS

Examination Report issued in corresponding German Patent Application No. 102013204716.9, dated Nov. 21, 2013.

* cited by examiner

*Primary Examiner* — Yonel Beaulieu
*Assistant Examiner* — Krishnan Ramesh
(74) *Attorney, Agent, or Firm* — Jones Robb, PLLC; Raymond L. Coppiellie (57) ABSTRACT

A method of operating a hydraulic brake system is described. A method of operating a hydraulic brake system of a motor vehicle having a mechatronic brake booster to boost a hydraulic pressure generated in a brake master cylinder of the brake system by a brake pedal of the motor vehicle determines whether a propulsion request is present during operation of the motor vehicle and actuates the mechatronic brake booster when a propulsion request has ended or been substantially reduced. During a predetermined time interval after the propulsion request has ended or been reduced, the mechatronic brake booster is operated at a minimum intensity such that no braking effect occurs during the predetermined time interval, unless a braking request occurs.

22 Claims, 4 Drawing Sheets

METHOD FOR OPERATING A HYDRAULIC BRAKE SYSTEM

CROSS-REFERENCE TO RELATED APPLICATIONS

This application claims the benefit of German Application No. 102013204716.9, filed on Mar. 18, 2013, which is hereby incorporated by reference in its entirety.

TECHNICAL FIELD

The present disclosure relates to a hydraulic brake system having a mechatronic brake booster and a method for controlling operation of a mechatronic brake booster of a hydraulic brake system of a motor vehicle.

BACKGROUND

Mechatronic brake boosters for hydraulic brake systems are known. Mechatronic brake boosters may, for example, increase hydraulic pressure generated by brake pedal actuation. Mechatronic brake boosters may include an electric motor which is operated to provide auxiliary braking force, for example in the form of increased hydraulic pressure.

Some electric-motor driven mechatronic brake boosters exhibit in certain situations a phenomenon called a "stiff brake pedal." That is, the "stiffness" of the brake pedal, or more precisely the characteristic curve of the counter-force offered by the brake pedal, is greater or steeper as a function of the actuation travel than the stiffness called for by a design of the brake pedal. This phenomenon occurs, in particular, when the driver depresses the brake pedal very rapidly. This phenomenon can irritate the driver and can also be dangerous if, as a result, the driver brakes more or less strongly than he actually intended.

An object of the present disclosure is to make the operation of a hydraulic brake system of a motor vehicle having a mechatronic brake booster more responsive, more comfortable for the driver, and safer.

SUMMARY

Exemplary embodiments of the present disclosure may solve one or more of the above-mentioned problems and/or may demonstrate one or more of the above-mentioned desirable features. Other features and/or advantages may become apparent from the description that follows.

In accordance with one aspect of the present disclosure, a method of operating a hydraulic brake system of a motor vehicle having a mechatronic brake booster to boost a hydraulic pressure generated in a brake master cylinder of the brake system by a brake pedal of the motor vehicle is provided. The method comprises determining whether a propulsion request is present during operation of the motor vehicle; and actuating the mechatronic brake booster when a propulsion request has ended or been substantially reduced. The mechatronic brake booster is operated at a minimum intensity such that no braking effect occurs during after the propulsion request has ended or been reduced, unless a braking request occurs.

In accordance with another aspect of the present disclosure, a method of operating a hydraulic brake system of a motor vehicle having a mechatronic brake booster comprises monitoring a status of a propulsion request during operation of the motor vehicle; and actuating the mechatronic brake booster when a propulsion request has ended or been substantially reduced. During a predetermined time interval after the propulsion request has ended or been reduced, the mechatronic brake booster is operated at a minimum intensity such that no braking effect occurs and stiffness of brake pedal of the motor vehicle is decreased.

In accordance with a further aspect of the present disclosure, a hydraulic brake system of a motor vehicle is disclosed. The hydraulic brake system comprises a mechatronic brake booster comprising a brake master cylinder configured to generate a hydraulic pressure corresponding to a depression of a brake pedal of a motor vehicle, and an electric motor configured to generate an auxiliary braking force for the master cylinder. The hydraulic brake system also comprises a controller configured to monitor a status of a propulsion request during operation of the motor vehicle. The controller is configured to actuate the electric motor at a minimum intensity such that no braking effect occurs when the propulsion request has ended or been substantially reduced.

In accordance with yet another aspect of the present disclosure, a method of operating a hydraulic brake system of a motor vehicle having a mechatronic brake booster is provided. The method comprises monitoring a position of an accelerator pedal, upon detection of an accelerator pedal release rate threshold, actuating a motor of the mechatronic brake booster, closing pressure feed valves in the brake system, controlling a speed of the motor to build a head pressure, and opening the pressure feed valves in response to a braking request or expiration of a predetermined time interval.

In accordance with a further aspect of the present disclosure, a hydraulic brake system of a motor vehicle is disclosed. The hydraulic brake system comprises a mechatronic brake booster including an electric motor; at least one wheel brake; at least one pressure feed valve configured to control flow of hydraulic brake fluid to the at least one wheel brake; and a controller configured to run the electric motor and to close the at least one pressure feed valve in response to detection of an accelerator pedal release rate threshold.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawing, which is incorporated in and constitutes a part of this specification, illustrates an exemplary embodiment of the present disclosure and together with the description, serves to explain the principles of the present disclosure.

BRIEF DESCRIPTION OF THE DRAWING

At least some features and advantages will be apparent from the following detailed description of embodiments consistent therewith, which description should be considered with reference to the accompanying drawing, wherein.

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

Reference will now be made in detail to various embodiments, examples of which are illustrated in the accompanying drawing. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, a method of operating a hydraulic brake system of a motor vehicle having a mechatronic brake booster to boost a hydraulic pressure generated in a brake master cylinder of the brake system by a brake pedal of the motor vehicle is provided. An exemplary hydraulic brake system having a mechatronic brake booster that may be operated in accordance with the present teachings is described in U.S. Pat. No. 6,634,724, entitled "Electrically Driven Brake Booster," the entire contents of which is incorporated herein by reference. In this example, a mechatronic brake booster in the form of a pedal-driven actuating pin applies a force to a piston of a brake master cylinder. The pin is surrounded by a cylinder that applies a force to the brake master cylinder and is displaceable by an electric motor back and forth in the direction of the piston. If a brake pedal travel sensor registers a braking request, the electric motor is set in motion in a manner corresponding to the braking request to generate an auxiliary braking force.

Additionally or alternatively, a method in accordance with the present disclosure may be used to operate a mechatronic brake booster in which an electric motor drives a piston that delivers additional hydraulic medium in order to increase the hydraulic pressure generated by pedal actuation.

In each of the systems noted above, operation of the systems in accordance with conventional methods requires actuation of the electric motor after brake pedal actuation. In contrast, a method in accordance with the present teachings continuously monitors operation of a motor vehicle to determine whether a propulsion request is present and, at the moment when a propulsion request is ended or substantially reduced, a mechatronic brake booster is actuated and, during a predetermined time interval after the propulsion request is ended or reduced, the mechatronic brake booster is operated at a minimum intensity such that no braking effect occurs during the predetermined time interval, unless a braking request is made during the predetermined time interval. A braking request may be in the form of driver actuation of the brake pedal, or it may be in the form of input from external sensors, such proximity sensors or other sensors used for collision avoidance. In one example, the motor may be operated at less than one percent (1%) of the motor's maximum speed.

In accordance with the present disclosure, operation of a hydraulic brake system having a mechatronic brake booster in the manner described herein substantially reduces the response time of a mechatronic brake booster. This is due to the fact that in a method of operation as described herein, an electric motor associated with the brake booster is already running, or after initial movement, the motor is held stationary with a small current supply. An electric motor in this state can be brought to relatively high speed or relatively high torque much more rapidly than if it is switched off completely as in conventional operation methods. This method deletes the delay time to start the motor, and since brake fluid is being moved, the motor is working against a hydraulic force which prevents the motor from running at a high speed where efficiency is low. In accordance with the present method, the not inconsiderable time needed to build up even a minimum initial magnetic field in an unenergized electric motor is minimized or eliminated.

Further, not only is the response time of the mechatronic brake booster substantially shortened with a method of operation in accordance with the present disclosure, but the subsequent pressure build-up in the hydraulic system takes place more rapidly, even after a small initial displacement of hydraulic medium has begun. In accordance with one aspect of the present disclosure, allowing the motor to run at a very low speed moves the brake fluid in the hydraulic system. An initial pressure may be built at the wheel brakes, and then pressure feed valves, which feed fluid to the wheel brakes may be closed to build up a head pressure without increasing wheel pressure.

Due to its shortened response time and the faster pressure build-up, a mechatronic brake booster operated in accordance with the present teachings can provide assistance in relatively short time. As a result, the driver, even when actuating the brake rapidly, does not have to exert significantly more than the designed pedal force to actuate the brake by delivering hydraulic medium.

In accordance with one aspect of the present disclosure, a method of operation a mechatronic brake booster may reduce hydraulic delay. When the motor of the mechatronic brake booster has been idle, there is a large pressure differential between the foot (brake pedal) and the wheel brake. The small movement of the motor moves the hydraulic fluid in the brake lines and reduces the pressure differential, thereby reducing hydraulic delay. In a situation in which hydraulic brake fluid is cold, the cold fluid is less viscous and is hard to move. In particular, without a reduction in pressure differential between the brake pedal and the wheel brake, the responsiveness of the hydraulic system may be delayed. Operation of the hydraulic brake system in accordance with the present teachings permits reduction of the pressure differential and increased responsiveness of the hydraulic brake system.

With a mechatronic brake booster as described U.S. Pat. No. 6,634,724 (noted above), when operated as described in the patent, a certain reduction in the stiffness of the brake pedal is possible because a small clearance is present between the actuating pin and the piston of the brake master cylinder, so that the electric motor can start before the actuating pin contacts the piston. However, this does not result in a decrease in response time but rather an increase of the response time of the mechatronic brake booster, and the stiffness of the brake pedal is reduced less as it is depressed more quickly.

In accordance with the present teachings, a reduction in stiffness of a brake pedal is effective only when a driver lifts the accelerator pedal (i.e., releases or lifts off the throttle) and not in other situations. For example when a motor vehicle is stationary (a predetermined time interval has lapsed) or when the motor vehicle is starting to move very gradually (there is a propulsion request), operation in accordance with the exemplary method would not decrease the stiffness of a brake pedal. In these other situations, however, it is seldom the case that the brake pedal is depressed very rapidly, and if that occurs the driver does not easily notice a stiff brake pedal. Therefore, in the most frequent cases irritation of the driver is minimized or prevented.

Figure 2A:
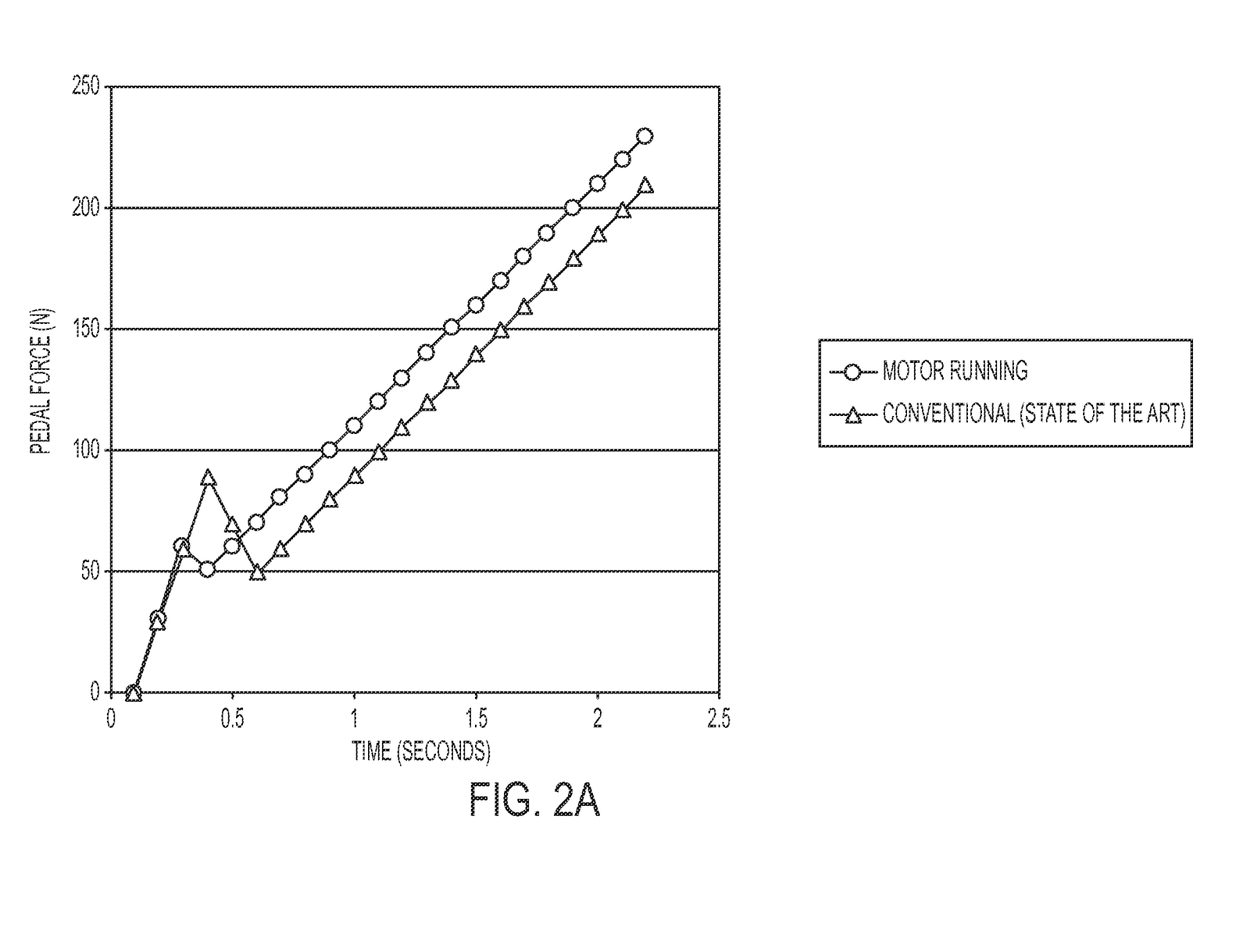
FIG. 2A is a graph of brake pedal force vs. time in accordance with one aspect of the present disclosure.
Figure 2B:
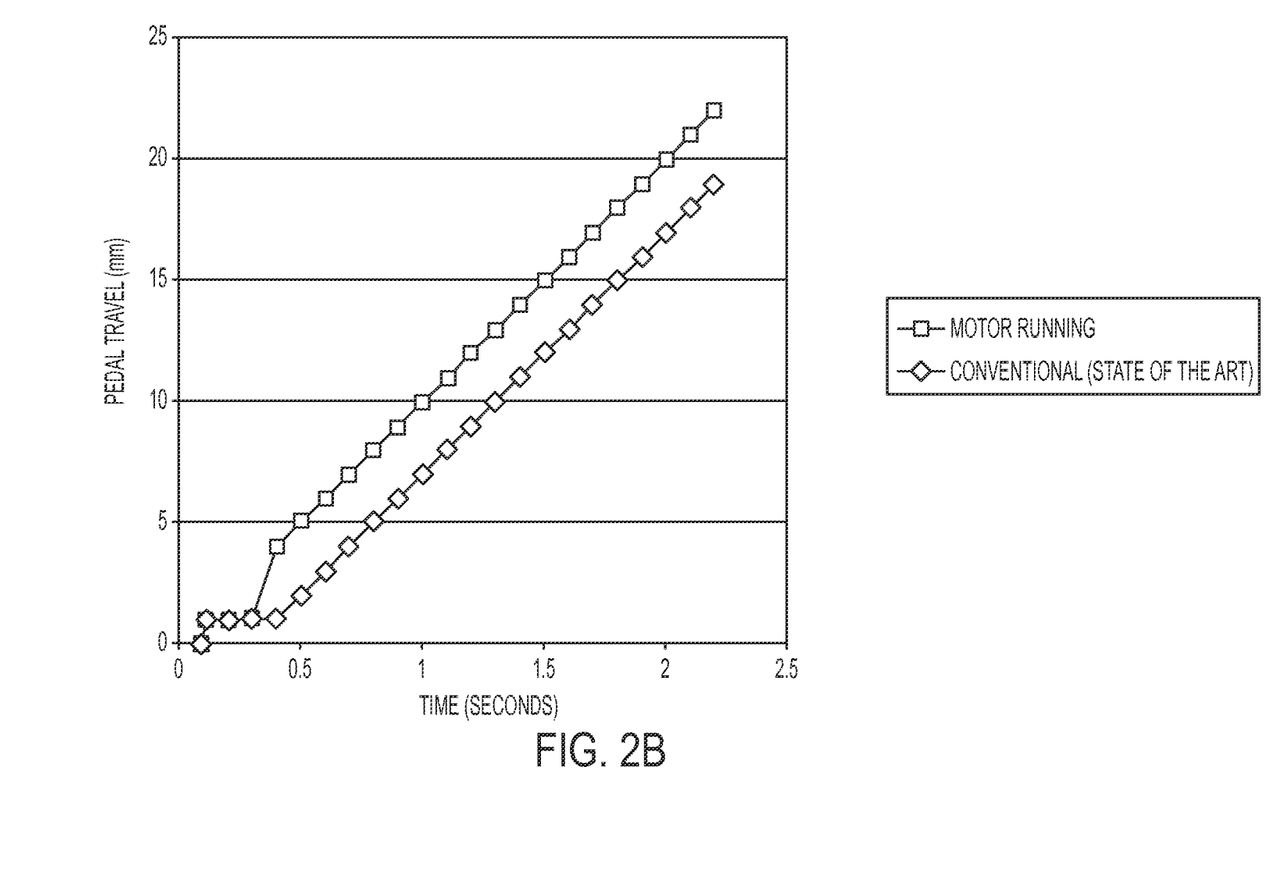
FIG. 2B is a graph of brake pedal travel vs. time in accordance with another aspect of the present disclosure.

In accordance with the present teachings, the minimum intensity at which the mechatronic brake booster is operated during a predetermined time interval, after the propulsion request has been ended or reduced, is preferably selected such that the mechatronic brake booster reacts to a braking request multiple times faster than if the booster had not been actuated when a propulsion request was ended or reduced. It has been shown that the delay with which the mechatronic brake booster takes effect can be shortened by at least approximately two-thirds. The force/travel characteristic curve of a brake pedal of the motor vehicle thereby becomes substantially more independent of the speed with which the brake pedal is depressed, and any remaining change in the stiffness of the brake pedal is practically no longer perceptible by a driver. This feature is illustrated in FIGS. 2A and 2B, in which FIG. 2A is a graph of brake pedal force (N) vs. time (sec) for operation of a brake pedal in both a conventional (state of the art) system and for operation of a brake pedal as disclosed herein. Similarly, FIG. 2B is a graph of brake pedal travel (mm) vs. time (sec) for operation of a brake pedal in both a conventional (state of the art) system and for operation of a brake pedal as disclosed herein. As illustrated in these graphs, the "stiffness" of the brake pedal, or more precisely the characteristic curve of the counter-force offered by the brake pedal, is greater or steeper as a function of the actuation travel in conventional systems than in systems utilizing a method in accordance with the present teachings.

In accordance with the present teachings, the predetermined time interval of the various exemplary embodiments described herein is preferably on the order of magnitude of several seconds. According to another exemplary embodiment, the predetermined time interval of the various exemplary embodiments described herein ranges from, for example, about two seconds to about twenty seconds, and in another embodiment, between about two seconds and about seconds. The predetermined time interval may be permanently preset or may vary as a function of given parameters. According to an exemplary embodiment, the predetermined time interval may vary, for example, as a function of operating parameters, such as vehicle speed.

A system in accordance with the present teachings, which may include a controller or the like, may recognize the end or reduction of a propulsion request by the release of an accelerator pedal of the motor vehicle (i.e., throttle lift off). For example, the end of reduction of the propulsion request can be regarded as the ending of the propulsion request if the accelerator pedal has fully returned to its zero position. This may be detected or sensed using various existing sensors in the vehicle, such as for example linear sensors detecting an amount of pedal travel, angle sensors detecting an amount of rotation of the pedal, a force sensor or any suitable sensor. The rate of throttle lift off (accelerator pedal release) may be used as a threshold for initializing a method in accordance with the present teachings. In accordance with one aspect of the present teachings, a method of operation is intended to increase brake responsiveness in panic braking situations. Such situations may be characterized and/or indicated by the rapid release of the accelerator pedal (rapid throttle liftoff). According to an exemplary embodiment, the end of the propulsion request can be regarded as a substantial reduction of a propulsion request if the accelerator pedal has been lifted by a preset distance without having yet reached its zero position.

According to an exemplary embodiment, a speed with which the accelerator pedal is released is not to be regarded as important for reducing the stiffness of a brake pedal.

According to an exemplary embodiment of the present disclosure, a mechatronic brake booster operated in accordance with the present method includes an electric motor to exert an additional force on the hydraulic piston in a direction parallel to the force exerted on a hydraulic piston via the brake pedal.

In accordance with one aspect of the present disclosure, the electric motor may be operated during the entire predetermined time interval at a minimum speed and/or a minimum torque at which no braking effect occurs during the predetermined time interval, unless a braking request is made during the predetermined time interval. In order to avoid exerting a braking effect and so as not to bring driver attention to the process, the motor speed runs slowly during an initial buildup of low pressure at the wheel brakes. After isolation of the wheel brakes via closure of pressure feed valves, the motor may be run at a higher speed to create a head pressure.

In accordance with another aspect of the present disclosure, the electric motor is caused to rotate by a small amount at the moment when a propulsion request ends or decreases such that no braking effect occurs during the predetermined time interval, unless a braking request is made during the predetermined time interval. For the remainder of the predetermined time interval the electric motor is stationary with a very small current supply, without producing a perceptible braking effect.

When the predetermined time interval has elapsed, the mechatronic brake booster may be reset, or its electric motor may be rotated back to its starting position, according to an exemplary embodiment of the present disclosure.

In accordance with another aspect of the present disclosure, a method as described herein may be used in electronic stability control (ESC). For example, in a situation in which it is necessary to build up torque on one or more wheels to stabilize the vehicle but the driver is not engaging the brake, the present method may be used to build up hydraulic fluid pressure and displace that fluid to the wheel brakes needed for a brake intervention. Thus, in this example, once a controller receives input indicating that a stability event has been triggered (ESC is intervening with a stability index); the motor of the mechatronic brake booster may be started and run at a desired rate to build up the desired fluid pressure. When the pressure is built up while feed valves are closed, opening the valves will allow a rapid push of fluid to the desired wheel brake(s) increasing the response time of the brakes. In such a method, feedback from one or more sensors, including a yaw rate sensor, a lateral acceleration sensor, a longitudinal acceleration sensor, and a roll rate sensor, which indicates a stability event may initialize the method.

For example, U.S. Pat. No. 8,532,906 B2 to Lu et al. ("the '906 patent"), entitled "Vehicle Stability Control System and Method" discloses a stability controller that can be configured to determine a braking amount or a throttle amount to maintain vehicle stability. FIG. 2 of the '906 patent discloses an exemplary method of preventing vehicle backsliding or backward rolling utilizing braking. In accordance with the present teachings, a method as disclosed in FIG. 2 of the '906 patent may be modified to incorporate a process of building a head pressure as described in detail further below and with regard to FIG. 3 of the present application. For example, when the stability controller determines that the vehicle is experiencing backsliding or back rolling, a process as described herein may be initiated. In particular, the process for building pressure while isolating wheel brakes from the pressure may be performed in parallel with the method illustrated in FIG. 2 of the '906 patent or may be incorporated into the illustrated method, as one of skill in the art would understand from the teachings set forth in the present disclosure. U.S. Pat. No. 8,532,906 B2 to Lu et al. is incorporated herein by reference in its entirety for its teaching of systems and methods for stability control. As will be understood by those of skill in the art, a method in accordance with the present disclosure may be performed with any electronic stability control system that relies on braking. Another exemplary method and structure is disclosed in U.S. Pat. No. 7,853,389 B2 to Luehrsen et al., entitled "Traction Control for Performance and Demonstration Spin," the entire content of which is incorporated herein by reference.

Additionally or alternatively, in a manner similar to that described above, a method in accordance with the present teachings may be used to run the motor of the mechatronic brake booster to enhance braking in a rollover situation. In such a method, feedback from one or more sensors, including a yaw rate sensor, a lateral acceleration sensor, a longitudinal acceleration sensor, and a roll rate sensor, which indicates a rollover event may initialize the method. During a rollover event, it is desirable to brake one wheel so that the wheel is sliding but the vehicle is not rolling over. In accordance with the present teachings, the indication of the onset of a rollover event can trigger running of the motor of the mechatronic brake booster to build up a desired fluid pressure. When the pressure is built up while feed valves are closed, opening the valves will allow a rapid push of fluid to the desired wheel brake to cause sliding of the wheel to which the fluid pressure is directed.

As will be understood by those of skill in the art, a method in accordance with the present disclosure may be performed with any rollover control system that relies on braking. For example, U.S. Pat. No. 8,444,229 B2 to Brewer et al., entitled "System and Method for Controlling a Hydraulic System," discloses a system and method for controlling rollover based, at least in part, on controlling pressure buildup in the hydraulic system through control of valve orifices. As will be understood by those of skill in the art, a method of building pressure while isolating wheel brakes from the pressure may be incorporated into the methods of Brewer et al. U.S. Pat. No. 8,444,229 B2 to Brewer et al. is incorporated herein by reference in its entirety for its teaching of systems and methods for rollover control. Another exemplary method and structure is disclosed in U.S. Pat. No. 7,647,148 B2 to Lu, entitled "Roll Stability Control System for an Automotive Vehicle Using Coordinated Control of Anti-Roll Bar and Brakes," the entire content of which is incorporated herein by reference.

As will be understood by one of skill in the art, systems which combine ESC and rollover control may also include a method in accordance with present disclosure.

As disclosed herein, a hydraulic brake system to be operated in accordance with the present teachings includes a mechatronic brake booster having an electric motor. Examples of such systems are disclosed in U.S. Pat. No. 6,634,724 B2 and in WO 2012/143310 A1, the entire contents of each of which is incorporated herein by reference.

In accordance with the present teachings, during operation of a motor vehicle having a hydraulic brake system as described above, whenever the driver of the motor vehicle lifts the accelerator pedal (i.e., releases pressure or force on the accelerator pedal (throttle lift) so that it may return to a non-actuated position), the electric motor of the mechatronic brake booster is operated for a predetermined time interval at a minimum speed and/or a minimum torque such that no braking effect occurs during the predetermined time interval, unless the driver depresses the brake pedal or unless a braking signal is received (for example, a signal is received from a proximity sensor initiating a collision warning). This pre-activation of the mechatronic brake booster is not observable by the driver.

In an alternative embodiment, detection that the driver is braking may be directly determined from a brake input rod travel sensor.

In accordance with the present teachings, if the electric motor cannot be caused to rotate slowly enough (as described above), the electric motor may be allowed to rotate a short distance initially, and then be caused to be stationary with a very small current supply for the remainder of the predetermined time interval. After the predetermined time interval has elapsed, the electric motor may be rotated back to restore the brake booster to its starting position.

By operating a hydraulic brake system having a mechatronic brake booster in accordance with the method disclosed herein, it has been shown that the effective response time of the mechatronic brake booster is substantially shortened, typically by approximately two-thirds, so that the driver does not notice an increase in the stiffness of the brake pedal, regardless of whether the driver depresses the brake pedal slowly or quickly.

Figure 1:
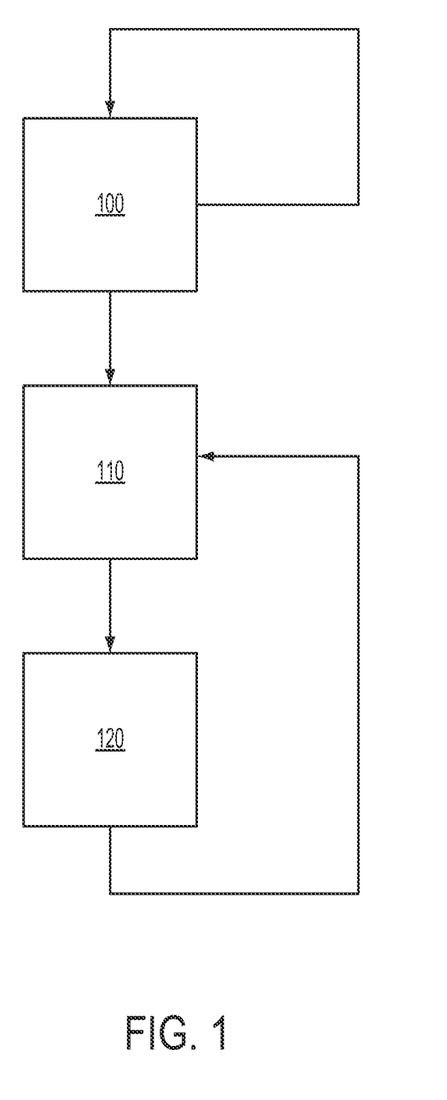
FIG. 1 depicts a schematic process for operating a hydraulic brake system, according to an exemplary embodiment.

Turning to FIG. 1, an exemplary embodiment of a method of operating a hydraulic brake system of a motor vehicle having a mechatronic brake booster including an electric motor is schematically depicted. In a first step 100, a determination is made whether a propulsion request is present (e.g., a driver is depressing an accelerator pedal) during operation of the motor vehicle. The condition of the accelerator pedal may be continuously monitored for real-time response of the mechatronic brake booster. That is, the determination of step 100 may be continuously made during operation of the motor vehicle, according to an exemplary embodiment. If a propulsion request is present, the process returns to step 100 to repeat the determination of step 100, as shown in FIG. 1. If it is determined that there is no propulsion request (e.g., a driver has lifted their foot from the accelerator pedal), the process proceeds to a second step 110.

In step 110, a mechatronic brake booster of the hydraulic brake system is actuated so that no braking effect occurs. According to an exemplary embodiment, actuation of the mechatronic brake booster is conducted when the propulsion request has ended or been substantially reduced. As disclosed herein, actuation of the mechatronic brake booster may include operating the electric motor of the mechatronic brake booster at a minimum speed and/or a minimum torque such that no braking effect occurs, unless the driver depresses the brake pedal. Alternatively, upon actuation, the electric motor may be allowed to rotate a short distance initially, and then be caused to be stationary with a very small current supply.

In a subsequent step 120, it is determined whether a predetermined time interval has elapsed after the propulsion request has ended or been reduced, in accordance with an exemplary embodiment of the present teachings. Step 120 may also include a determination of whether a braking request has occurred, according to an exemplary embodiment of the present disclosure. A brake request may be made by the driver, via actuation of the brake pedal, or by sensors, such as when external sensors (such as proximity sensors) initiate a collision avoidance sequence. When a determination has been made that the predetermined time interval has not elapsed and a braking request has not occurred, the process may return to step 110 to continue actuation of the brake booster and the determination(s) in step 120. When a determination has been made that the predetermined time interval has elapsed and/or a brake request has occurred, the process may end.

The method illustrated in FIG. 1 can be performed in one or more devices of the vehicle. For example, the method can be performed by a control device of the brake system such as a central control unit (not shown) or controller. The control device can be implemented within any element of the hydraulic brake system such as a control unit. Alternatively, the control device can be a separate device from any of the above-described hydraulic brake system elements. The control device can include a storage element such as a disk drive, flash drive, memory circuit, or other memory device. The storage element can store software which can be used in operation of the control device. Software can include computer programs, firmware, or some other form of machine-readable instructions, including an operating system, utilities, drivers, network interfaces, applications, and the like. The control device can further include a processing element such as a microprocessor or other circuitry to retrieve and execute software from the storage element. The control device can also comprise other components such as a power management unit, a control interface unit, etc.

Figure 3:
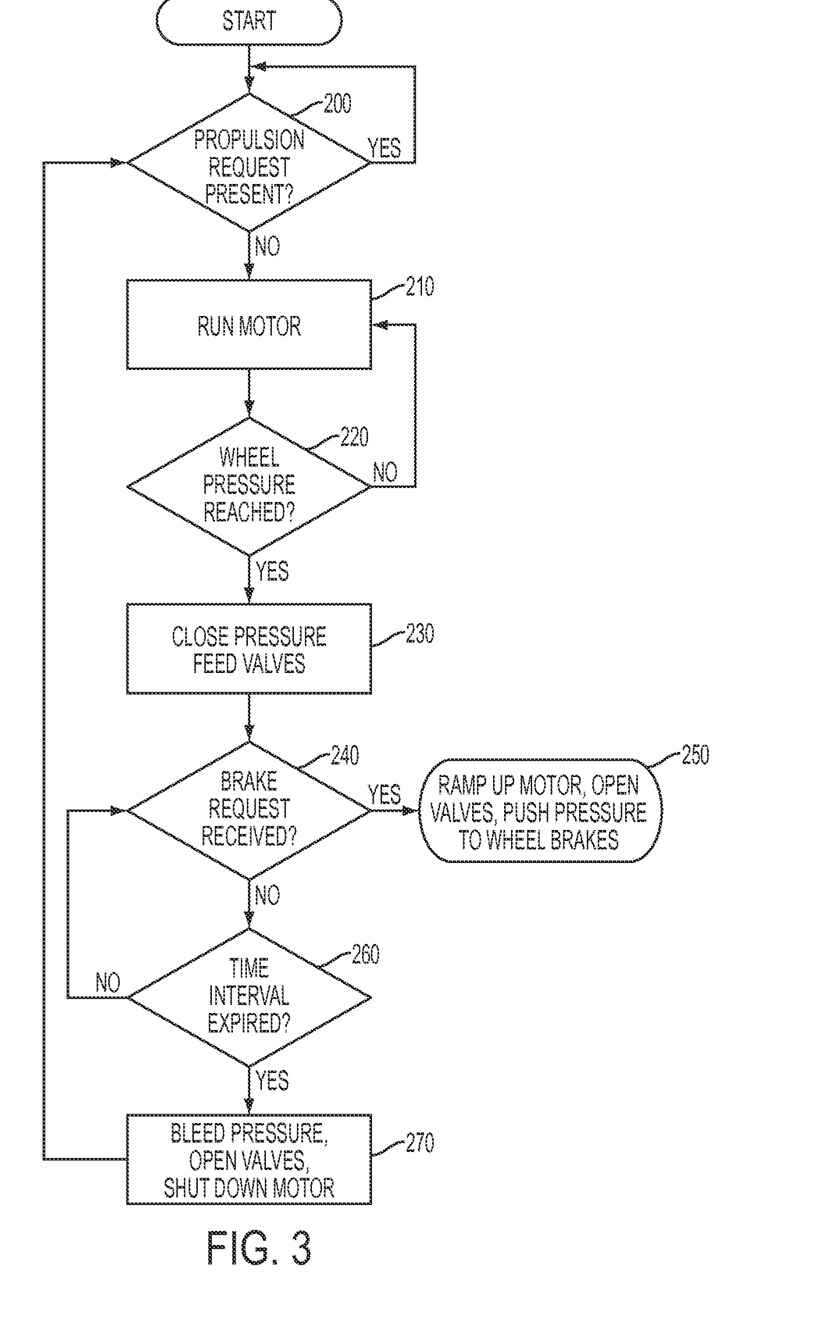
FIG. 3 depicts a schematic process for operating a hydraulic brake system according to another exemplary embodiment of the present disclosure.

In accordance with the present disclosure, another exemplary embodiment of a method of operating a hydraulic brake system of a motor vehicle having a mechatronic brake booster including an electric motor is provided and is schematically illustrated in FIG. 3. In a first step 200, accelerator pedal position may be monitored such that a determination is made whether a propulsion request is present (e.g., a driver is depressing an accelerator pedal) during operation of the motor vehicle. The condition of the accelerator pedal may be continuously monitored for real-time response of the mechatronic brake booster. That is, the determination of step 200 may be continuously made during operation of the motor vehicle, according to an exemplary embodiment. Determination of the presence of a propulsion request may be based on sensor feedback using various existing sensors in the vehicle, such as for example linear sensors detecting an amount of accelerator pedal travel, angle sensors detecting an amount of rotation of the accelerator pedal, a force sensor or any suitable sensor operatively associated with the accelerator pedal as would be understood by one of ordinary skill in the art. The rate of throttle lift off (accelerator pedal release) may be used as a threshold for initializing a method in accordance with the present teachings.

In accordance with one aspect of the present teachings, a method of operation is intended to increase brake responsiveness in panic braking situations. Such situations may be characterized and/or indicated by the rapid release of the accelerator pedal (rapid throttle liftoff). For example, a rate of release (rate of travel of the accelerator pedal) of 100-200 mm/second may indicate that a propulsion request has ended or has been reduced and, thus, trigger the method of the present disclosure (i.e., propulsion request is no longer present for purposes of step 200). Additionally and/or alternatively, monitoring a position of the throttle rate may be dependent on an engine speed threshold. For example, it may not be desirable to operate a mechatronic brake booster in accordance with the present method a slow speeds of travel because panic braking at low speeds is unlikely. At such low speeds, running the motor in accordance with the present teachings would result in unnecessary current consumption and increase of motor ramp up.

If a propulsion request is present, the process returns to step 200 to repeat the determination of step 200. If it is determined that there is no propulsion request (e.g., a driver has lifted their foot from the accelerator pedal), the process proceeds to a second step 210.

In step 210, a mechatronic brake booster of the hydraulic brake system is actuated so that no braking effect occurs. According to an exemplary embodiment, actuation of the mechatronic brake booster is conducted when the propulsion request has ended or been substantially reduced. As disclosed herein, actuation of the mechatronic brake booster may include operating the electric motor of the mechatronic brake booster at a minimum speed and/or a minimum torque such that no braking effect occurs, unless the driver depresses the brake pedal. Alternatively, upon actuation, the electric motor may be allowed to rotate a short distance initially, and then be caused to be stationary with a very small current supply. At the time the motor begins to run, a predetermined time interval begins to run. The motor will continue to run for the predetermined time interval unless a braking request is received.

As the motor begins to run, a small buildup of hydraulic fluid pressure at the wheel brakes may be detected. In this exemplary embodiment, it may be desirable to allow a minimal buildup of pressure in order to eliminate any air gaps in the brake lines. During this period, the motor may be running at a low speed to facilitate a slow buildup of pressure. For example, the motor may be running at a speed of less than one percent (>1%) of a maximum speed of the motor. After determining the presence of a buildup of a minimal pressure at the wheel brakes, for example, a pressure of about 1.5 bar to about 3.0 bar (the pressure may be measured by existing sensors as will be understood by those of ordinary skill in the art) at step 220, pressure feed valves (feeding hydraulic fluid to the wheel brakes) are closed at a step 230. With regard to the pressure build up at the wheel brake, the pressure should not be high enough for a driver to detect the effect of the pressure build up.

Although described herein as occurring after the motor begins to run, it is contemplated that the motor may begin to run simultaneously with closure of the pressure feed valves. However, allowing the motor to run for a brief period first may offer the benefit of removing any air from the brake lines.

With the pressure feed valves closed and the motor of the mechatronic brake booster running, a head pressure is built up. In an exemplary embodiment, the head pressure may be between about 40 bar and 70 bar. The head pressure allows a faster reaction time of the brakes by rapidly increasing pressure at the wheel brakes when the pressure feed valves are opened. While the valves are closed, the speed of the motor may be increased to increase the pressure build up. For example, the motor may be running at a speed of less than thirty percent (>30%) of a maximum speed of the motor. Once an initial pressure threshold is reached, for example about 40 bar, the speed of the motor may be reduced again to a speed, for example, of less than one percent (>1%) of a maximum speed of the motor, to allow slow increase of pressure toward the upper threshold of about 70 bar. The parameters of motor speed and pressure build up may be varied, and in one exemplary embodiment are set such that the upper threshold of pressure build up is reached as the predetermined time interval expires.

During this period, the controller continues to monitor for a brake request, initiated either by the driver or by sensors of the system. If a brake request is detected, at a step 240, the pressure feed valves are opened and the motor speed is rapidly increased to shoot the head pressure to the wheel brakes at a step 250. In accordance with one exemplary embodiment, the monitoring for a brake request may occur continuously throughout the process and in parallel with the other steps described herein.

In a step 260, it is determined whether a predetermined time interval has elapsed after the propulsion request has ended or been reduced, in accordance with an exemplary embodiment of the present teachings. In one exemplary embodiment, the predetermined time interval may be between about two seconds and about 5 seconds (2-5 seconds). In another exemplary embodiment, the predetermined time interval may be between about two seconds and about twenty seconds (2-20 seconds). When a determination has been made that the predetermined time interval has not elapsed (and if a braking request has not occurred), the process may return to step 240 to continue running of the motor and build up of a head pressure. When a determination has been made that the predetermined time interval has elapsed, the head pressure is reduced by reducing torque and then opening the pressure feed valves at step 270. This ends the process and the motor is turned off until a new throttle lift event is detected at step 200 or a new braking event signal is received.

In accordance with the present teachings, an exemplary embodiment of a method of operating a hydraulic brake system including a mechatronic brake booster with a motor is described. Upon detection of throttle liftoff (i.e., driver removing foot from the brake pedal) or of an external brake request (i.e., from external sensors associated with collision avoidance), the method is initiated. A motor of the mechatronic brake booster is run at a low speed until a pressure buildup of 1.5 bar can be measured at the wheel brakes. At that time, the feed valves are closed and the motor is run at a significantly higher speed to rapidly increase head pressure to 40 bar. Once 40 bar is reached, the motor is again run at the low speed to build up the head pressure to 70 bar. The time period to achieve this process, without interruption by a brake request, is about 20 seconds. Thus, the predetermined time interval in this example is 20 seconds. At the end of the predetermined time interval, the pressure is bled away and then the pressure feed valve are opened. If, during the predetermined time period a braking request is received/detected, the motor ramps up and the pressure feed valves open, allowing the head pressure to move to the wheel brakes.

The method described above can be performed in one or more devices of the vehicle. For example, the method can be performed by a control device of the brake system such as a central control unit (not shown) or controller. The control device can be implemented within any element of the hydraulic brake system such as a control unit. Alternatively, the control device can be a separate device from any of the above-described hydraulic brake system elements. The control device can include a storage element such as a disk drive, flash drive, memory circuit, or other memory device. The storage element can store software which can be used in operation of the control device. Software can include computer programs, firmware, or some other form of machine-readable instructions, including an operating system, utilities, drivers, network interfaces, applications, and the like. The control device can further include a processing element such as a microprocessor or other circuitry to retrieve and execute software from the storage element. The control device can also comprise other components such as a power management unit, a control interface unit, etc.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

It is to be understood that the particular examples and embodiments set forth herein are non-limiting, and modifications to structure, dimensions, materials, and methodologies may be made without departing from the scope of the present teachings.

Other embodiments in accordance with the present disclosure will be apparent to those skilled in the art from consideration of the specification and practice of the invention disclosed herein. It is intended that the specification and examples be considered as exemplary only, with a true scope and spirit being indicated by the following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages, or proportions, and other numerical values used in the specification and claims, are to be understood as being modified in all instances by the term "about," to the extent they are not already so modified. Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

What is claimed is:

1. A method of operating a hydraulic brake system of a motor vehicle having a mechatronic brake booster to boost a hydraulic pressure generated in a brake master cylinder of the brake system by a brake pedal of the motor vehicle, the method comprising:
    determining whether a propulsion request is present during operation of the motor vehicle; and
    actuating the mechatronic brake booster when a propulsion request has ended or been substantially reduced;
    wherein, during a predetermined time interval after the propulsion request has ended or been reduced, the mechatronic brake booster is operated at a minimum intensity such that no braking effect occurs during the predetermined time interval, unless a braking request occurs.

2. The method as claimed in claim 1, wherein determining whether a propulsion request is present includes continuously monitoring a status of an accelerator pedal.

3. The method as claimed in claim 1, wherein the predetermined time interval is about two or more seconds.

4. The method as claimed in claim 1, wherein the predetermined time interval ranges from about two seconds to about five seconds.

5. The method as claimed in claim 1, wherein the ending or reduction of the propulsion request occurs when an accelerator pedal of the motor vehicle is released.

6. The method as claimed in claim 1, wherein the mechatronic brake booster comprises an electric motor to exert an additional force on a hydraulic piston of the brake mechatronic booster parallel to a force exerted on the hydraulic piston via the brake pedal.

7. The method as claimed in claim 6, wherein the electric motor is operated at a minimum speed and/or a minimum torque during the predetermined time interval such that no braking effect occurs during the predetermined time interval unless a braking request occurs.

8. The method as claimed in claim 6, wherein, when the propulsion request is ended or reduced, the electric motor rotates a short distance such that no braking effect occurs during the predetermined time interval, unless a braking request occurs during the predetermined time interval, and the electric motor remains stationary with a non-zero current supply insufficient to rotate the motor for a remainder of the predetermined time interval.

9. The method as claimed in claim 8, wherein after the predetermined time interval has elapsed the electric motor rotates back to a starting position of the electric motor.

10. The method as claimed in claim 1, wherein the determining is continuously conducted during the operation of the motor vehicle.

11. A method of operating a hydraulic brake system of a motor vehicle having a mechatronic brake booster, the method comprising:
    during operation of the motor vehicle, monitoring a status of a propulsion request; and
    actuating the mechatronic brake booster when a propulsion request has ended or been substantially reduced;
    wherein, during a predetermined time interval after the propulsion request has ended or been reduced, the mechatronic brake booster is operated at a minimum intensity such that no braking effect occurs and stiffness of brake pedal of the motor vehicle is decreased.

12. A hydraulic brake system of a motor vehicle, comprising:
    a mechatronic brake booster comprising:
        a brake master cylinder configured to generate a hydraulic pressure corresponding to a depression of a brake pedal of a motor vehicle, and
        an electric motor configured to generate an auxiliary braking force for the master cylinder; and
    a controller configured to monitor a status of a propulsion request during operation of the motor vehicle;
    wherein the controller is configured to actuate the electric motor at a minimum intensity such that no braking effect occurs when the propulsion request has ended or been substantially reduced.

13. The hydraulic brake system of claim 12, wherein, upon actuation of the electric motor, the controller is configured to operate the electric motor at a minimum intensity for a predetermined time interval unless a braking request occurs.

14. A method of operating a hydraulic brake system of a motor vehicle having a mechatronic brake booster, the method comprising:
    monitoring a position of an accelerator pedal;
    upon detection of an accelerator pedal release rate exceeding a release rate threshold, actuating a motor of the mechatronic brake booster;
    closing pressure feed valves in the brake system;
    controlling a speed of the motor to build a head pressure; and
    opening the pressure feed valves in response to a braking request or expiration of a predetermined time interval.

15. The method of claim 14, wherein the braking request includes driver input or external sensor input.

16. The method of claim 14, wherein actuation of the motor and closing the pressure feed valves occur substantially simultaneously.

17. The method of claim 14, wherein building a head pressure includes building a head pressure of between about 40 bar and about 70 bar.

18. The method of claim 14, wherein actuating the motor includes running the motor at a speed of less than 1% of a maximum motor speed.

19. The method of claim 14, further comprising, prior to closing the pressure feed valves, building a hydraulic fluid pressure of about 1.5 bar to about 3.0 bar at wheel brakes of the vehicle.

20. The method of claim 14, wherein controlling a speed of the motor to build a head pressure includes running the motor at a speed of between about 1% and about 30% of a maximum motor speed.

21. The method of claim 14, wherein the predetermined time interval is between about two seconds and about twenty seconds.

22. A hydraulic brake system of a motor vehicle, comprising:
    a mechatronic brake booster including an electric motor;

at least one wheel brake;
at least one pressure feed valve configured to control flow of hydraulic brake fluid to the at least one wheel brake; and
a controller configured to run the electric motor and close the at least one pressure feed valve in response to an accelerator pedal release rate exceeding a release rate threshold.

* * * * *